Jan. 29, 1957 O. L. PATTERSON 2,779,871
DIFFERENTIATION CIRCUIT
Original Filed July 30, 1951

INVENTOR.
OMAR L. PATTERSON
BY Busser, Smith & Harding
ATTORNEYS

United States Patent Office 2,779,871

Patented Jan. 29, 1957

2,779,871

DIFFERENTIATION CIRCUIT

Omar L. Patterson, Media, Pa., assignor to Sun Oil Company, Philadelphia, Pa., a corporation of New Jersey Original application July 30, 1951, Serial No. 239,279. Divided and this application October 24, 1952, Serial No. 316,664

4 Claims. (Cl. 250—27)

This invention relates to computing circuits and has particular reference to a circuit for performing differentiation.

This application is a division of my application Serial No. 239,279, filed July 30, 1951. Reference may also be made to my prior applications Serial Nos. 130,270, filed November 30, 1949, Patent No. 2,727,682 granted December 20, 1955, and 196,480, filed November 18, 1950.

Electronic computing circuits are frequently only approximate in their computing functions and, in particular, are usually sensitive to voltage variations and changes in characteristics of component elements particularly thermionic tubes. Additionally, using circuits heretofore known, computations could be carried out to only a very limited degree of accuracy.

In accordance with the present invention there is provided a differentiation circuit of high accuracy and very substantial independence of tube characteristics. The differentiation circuit additionally has the advantages that a pure derivative output is provided for an input function without the addition of constant or variable terms such as usually occur in the case of circuits of this type. Furthermore, the improved differentiation circuit has a high impedance input.

As will appear hereafter, there is provided as a component of the differentiation circuit a high gain differential amplifier which is particularly responsible for the accuracy of the computations involved and their independence of tube characteristics.

The general object of the invention relates to the provision of a differentiation circuit having the characteristics indicated. This object and other objects, particularly relating to details of construction and operation, will become apparent from the following description read in conjunction with the accompanying drawing, in which.

A differential amplifier of preferred type is utilized to secure high accuracy and independence of tube characteristics, though it will be understood that other types of differential amplifiers may be used.

Figure 1:
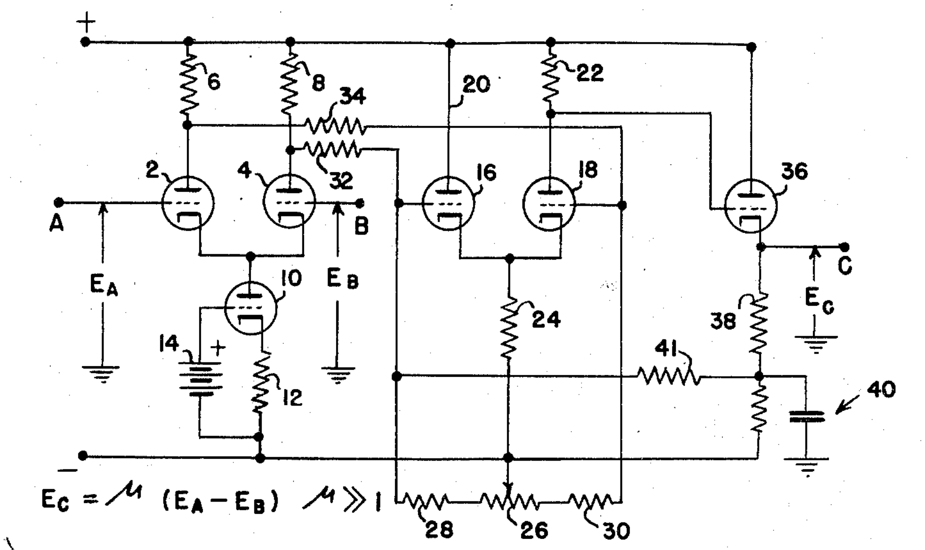
Figure 1 is a wiring diagram of a high gain differential amplifier preferably used as an element of the differentiation circuit.

A preferred form of high gain differential amplifier is illustrated in Figure 1 and is of the type described in "Vacuum Tube Amplifiers," volume 18, Radiation Laboratory Series, page 485, McGraw-Hill, 1948. It will be noted that this differential amplifier is, in many respects, similar to that disclosed in my application, Serial No. 196,480. It involves an improvement thereover in the provision of a constant current triode.

A pair of triodes 2 and 4 have their grids connected to the input terminals A and B. These triodes are provided with anode load resistors 6 and 8 and their cathodes are connected together and to the anode of a triode 10 arranged in a cathode follower circuit, there being provided the cathode load resistor 12. A battery 14 or other source of fixed potential is connected between the remote end of the cathode resistor 12 and the grid of triode 10.

The grids of a pair of triodes 16 and 18 are respectively connected through resistances 32 and 34 to the anodes of triodes 4 and 2. The anode of triode 16 is connected directly to the positive potential supply line. The anode of triode 18 is connected to the same supply line through a load resistor 22. The cathodes of triodes 16 and 18 are connected to each other and to a common cathode load resistor 24 which is, in turn, connected to a negative potential supply line. To this line there is also connected the contact of a potentiometer 26 which is connected respectively through resistances 28 and 30 to the grids of triodes 16 and 18. An output triode 36 is connected in a cathode follower circuit, its cathode being connected to the negative potential supply line through a resistor 38 and a resistance-capacitance network indicated at 40. Feedback is provided through resistance 41 to the grid of triode 16. The grid of triode 36 is connected to the anode of triode 18 and the anode of triode 36 is connected to the positive potential supply line. The output terminal C is connected to the cathode of triode 36.

With a balancing adjustment properly made at potentiometer 26, the action of this differential amplifier is to provide at the output terminal C a potential $E_C$ which is related to the input potentials at terminals A and B, namely $E_A$ and $E_B$ in accordance with the expression given below the circuit diagram in Figure 1. By virtue of the amplification which is provided in the circuit, the constant $\mu$ has a value greatly exceeding unity and, in fact, with a proper choice of circuit constants, this factor may have a value as high as 10,000.

In the case of the differential amplifier circuit illustrated and described in said Patterson application, Serial No. 196,480, the cathodes of the triodes corresponding to 2 and 4 are connected to the negative supply line through a resistor. When such a connection is made, the expression for $E_C$ contains an additional term involving the sum of the potentials $E_A$ and $E_B$. This common mode of these potentials is substantially completely eliminated by the provision of the triode 10 and its connections in place of a fixed resistance, the action of this triode being to provide a constant total current from the cathodes of triodes 2 and 4. As will be evident, this constant current condition results from the fact that the cathode potential of triode 10 with respect to the lower end of resistor 12 is maintained substantially constant by the provision of the battery 14, the positive terminal of which is connected to the grid of triode 10. It will be evident, therefore, that if the triodes 2 and 4 are similar in their characteristics, as they desirably should be, a simultaneous change of potential of the grids of both the same sense and amount will result in no change of the currents through the load resistors 6 and 8 and, consequently, no output signals to the grids of the triodes 16 and 18. When, therefore, the triodes 2 and 4 are similar to each other and the triodes 16 and 18 are also similar to each other, and minor differences are subjected to substantial elimination by adjustment at potentiometer 26, the expression given below the circuit diagram holds to a high degree of accuracy and the output potential is extremely sensitive to differences between the input potentials. As will appear hereafter, this condition may be utilized in securing a high precision of equality between various potentials, in view of the high value of the factor $\mu$. The high numerical value of this factor may be also utilized to secure ratios, as will appear hereafter, which are very nearly equal to unity.

A highly important feature of the differential amplifier as a basic computer element, especially for long time operation, is mutual cancellation of effects of heater voltage variation and "aging" of tube characteristics.

The differential amplifier above described, or a differential amplifier of other suitable type, is utilized in a subtraction circuit of highly accurate characteristics.

Figure 2:
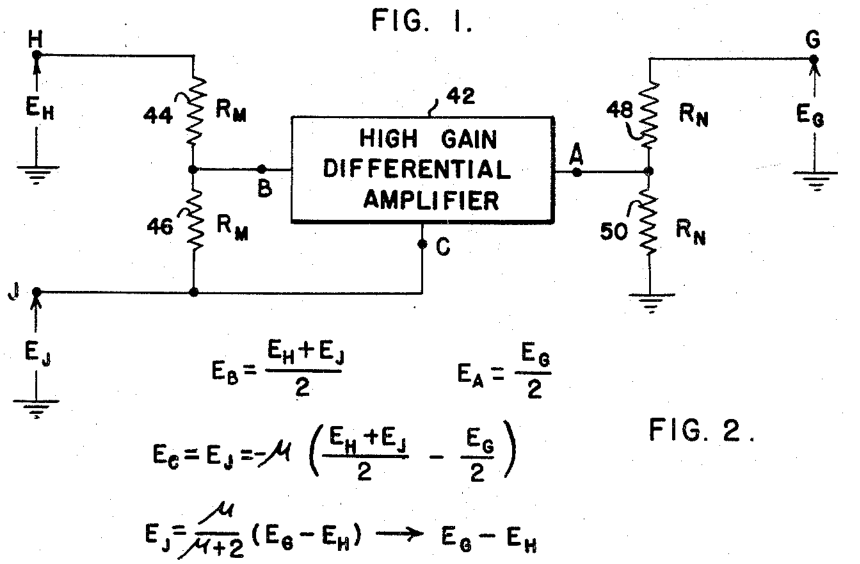
Figure 2 is a diagram showing a high accuracy subtraction circuit involved as an element of said differentiation circuit.

In this subtraction circuit the high gain differential amplifier of Figure 1 is indicated at 42, its terminals A, B and C being indicated in Figure 2 to correspond with those in Figure 1. The terminal B is connected to the junction of a pair of resistors 44 and 46 which initially may be considered to have the same resistance value $R_M$. The terminal A is similarly connected to the junction of a pair of resistors 48 and 50 which may also be assumed to have the same resistance value $R_N$. The upper end of resistor 48 is connected to a terminal G, while the lower end of resistor 50 is grounded. The upper end of resistor 44 is connected to a terminal H, while the lower end of resistor 46 is connected both to the terminal C and an output terminal J. Terminals G and H constitute input terminals for the subtraction circuit. That the output potential $E_J$ appearing at terminal J is very precisely equal to the difference of the input potentials $E_G$ and $E_H$ appearing at terminals G and H will be evident from consideration of the expressions given below the circuit diagram in Figure 2. When the value of $\mu$ is very large, as previously described, it will be evident that the fractional factor involved in the last line of the expressions is very nearly equal to unity. Accordingly, an output potential is provided which is substantially equal to the difference of the input potentials. It will be evident that, even though the value of $\mu$ may vary from one high gain differential amplifier to another, or during the use of an amplifier because of changes in tube characteristics, the subtraction circuit output is highly independent of any such variations of operating characteristics of the differential amplifier. The circuit is also capable of handling a very wide range of both positive and negative potentials.

In particular, it is to be noted that this subtraction circuit does not involve any additive term derived from tube potentials or other source as do subtraction circuits, heretofore known. This fact is particularly important in uses of the subtraction circuit for integration or differentiation.

Figure 3:
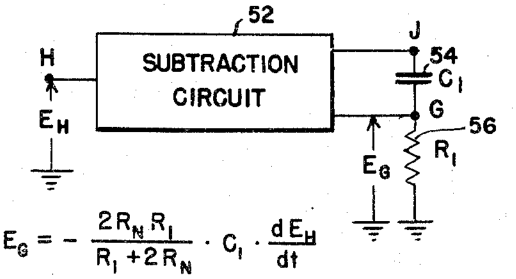
Figure 3 is a wiring diagram illustrating the improved differentiation circuit.

Figure 3 illustrates a very accurate differentiating circuit in which the subtraction circuit of Figure 2 is illustrated at 52, the terminals G, H and J of the subtraction circuit being indicated in correspondence with those in Figure 2. A condenser 54 is connected between the terminals G and J and a resistor 56 is connected between the terminal G and ground. If a potential is introduced at H having the value $E_H$, there will appear at the terminal G a potential given by the equation appearing below the circuit diagram in Figure 3, in which the fractional term approaches $R_1$ if $R_N$ is considerably greater than $R_1$.

It may be noted that, in contrast with differentiating circuits heretofore known which provide only approximations to precise differentiation and are subject to tube characteristics, supply voltage fluctuations, and the like, the present differentiating circuit is highly independent of such matters and is very precise.

As will be noted from the expression given below the circuit diagram in Figure 3, the output potential is completely independent of terms other than the desired derivative term. This is in contrast with prior differentiation circuits in which true differentiation does not occur, there being involved in addition to the time-derivative term other terms representing either the function being subjected to differentiation or higher derivatives.

From consideration of Figure 2 in conjunction with Figure 3, it will be evident that the improved differentiation circuit may also have a very high input impedance by a choice of high resistance value at $R_M$. This will be the case despite the particular magnitude of the RC constant involved as the derivative multiplier.

What is claimed is:

1. A differentiating circuit comprising a reference terminal, an input terminal, a second terminal, a series arrangement of a capacitance and a resistance connected between said second terminal and said reference terminal with the capacitance connected to said second terminal and the resistance connected to said reference terminal, and means providing at said second terminal a potential relative to said reference terminal which is substantially the difference between the potential of the junction of said resistance and capacitance relative to said reference terminal and the potential of said input terminal relative to said reference terminal, whereby there is provided at said junction a potential relative to said reference terminal which is substantially proportional to the first time derivative of the potential of said input terminal relative to said reference terminal.

2. A differentiating circuit according to claim 1 in which said means comprises a subtraction circuit.

3. A differentiating circuit according to claim 2 in which the subtraction circuit comprises a differential amplifier having two input terminals and an output terminal, a pair of connected impedances having their junction connected to one of the last mentioned input terminals, a second pair of connected impedances having their junction connected to the other of the last mentioned input terminals, and a connection between the end of one of said impedances and the last mentioned output terminal.

4. A differentiating circuit according to claim 3 in which said impedances are resistances.

References Cited in the file of this patent

UNITED STATES PATENTS

| | | |
|---|---|---|
| 2,324,797 | Norton | July 20, 1943 |
| 2,412,227 | Och et al. | Dec. 10, 1946 |
| 2,567,532 | Stephenson | Sept. 11, 1951 |
| 2,581,456 | Swift | Jan. 8, 1952 |
| 2,640,883 | Buchner | June 2, 1953 |
| 2,682,607 | Schmitt et al. | June 29, 1954 |

OTHER REFERENCES

"Electrical Analogue Computing" by Mynal, pages 283–285, September 1947, Electronic Engineering.

Waveforms, by Chance et al., vol. 19, Radiation Laboratories Series, pages 360–361, 642–643, and 648–650, McGraw-Hill Publishing Co., Inc. 1949.